(12) United States Patent
Baehrle-Miller et al.

(10) Patent No.: US 11,999,329 B2
(45) Date of Patent: Jun. 4, 2024

(54) METHOD FOR VERIFYING THE PARKING BRAKE FORCE IN A VEHICLE

(71) Applicant: Robert Bosch GmbH, Stuttgart (DE)

(72) Inventors: Frank Baehrle-Miller, Schoenaich (DE); Helmut Wolff, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/750,185

(22) PCT Filed: Jun. 27, 2016

(86) PCT No.: PCT/EP2016/064856
§ 371 (c)(1),
(2) Date: Feb. 3, 2018

(87) PCT Pub. No.: WO2017/021061
PCT Pub. Date: Feb. 9, 2017

(65) Prior Publication Data
US 2018/0229710 A1 Aug. 16, 2018

(30) Foreign Application Priority Data
Aug. 4, 2015 (DE) ............... 10 2015 214 809.2

(51) Int. Cl.
*B60T 17/22* (2006.01)
*B60Q 9/00* (2006.01)
(Continued)

(52) U.S. Cl.
CPC .............. *B60T 17/221* (2013.01); *B60Q 9/00* (2013.01); *B60T 7/042* (2013.01); *B60T 7/045* (2013.01);
(Continued)

(58) Field of Classification Search
CPC .... B60T 13/741; B60T 13/746; B60T 13/662; B60T 13/745; B60T 13/586;
(Continued)

(56) References Cited

U.S. PATENT DOCUMENTS 7,383,928 B2 *  6/2008  Leboisne ............... B60T 13/52
                                                       180/287
8,468,820 B2 *  6/2013  Drumm ................... B60T 7/042
                                                        60/545

(Continued)

FOREIGN PATENT DOCUMENTS

CN         1231638 A     10/1999
CN       102256843 A     11/2011
(Continued)

OTHER PUBLICATIONS

International Search Report corresponding to PCT Application No. PCT/EP2016/064856, dated Sep. 19, 2016 (German and English language document) (5 pages).

*Primary Examiner* — Xuan Lan Nguyen
(74) *Attorney, Agent, or Firm* — Maginot, Moore & Beck LLP

(57) ABSTRACT

A method for verifying the parking brake force in a vehicle includes comparing a travel of a brake booster with a reference travel. The method further includes producing an error signal in case of a predetermined deviation between the travel of the brake booster and the reference travel. The vehicle includes a hydraulic vehicle brake with a brake booster and an electromechanical brake mechanism with an electric brake motor for producing a braking force to displace a brake piston.

10 Claims, 3 Drawing Sheets

(51) Int. Cl.
  *B60T 7/04*     (2006.01)
  *B60T 13/58*    (2006.01)
  *B60T 13/66*    (2006.01)
  *B60T 13/74*    (2006.01)
  *F16D 55/226*   (2006.01)
  *F16D 65/18*    (2006.01)
  *F16D 121/04*   (2012.01)
  *F16D 121/24*   (2012.01)

(52) U.S. Cl.
  CPC .......... *B60T 13/586* (2013.01); *B60T 13/662* (2013.01); *B60T 13/741* (2013.01); *B60T 13/745* (2013.01); *B60T 13/746* (2013.01); *F16D 55/226* (2013.01); *F16D 65/183* (2013.01); *B60T 2220/04* (2013.01); *B60T 2270/413* (2013.01); *F16D 2121/04* (2013.01); *F16D 2121/24* (2013.01)

(58) Field of Classification Search
  CPC ...... B60T 13/588; B60T 17/221; B60T 7/042; B60T 2270/413; B60Q 9/00
  See application file for complete search history.

(56) References Cited

U.S. PATENT DOCUMENTS

| | | |
|---|---|---|
| 9,033,427 B2 | 5/2015 | Berger et al. |
| 2010/0114444 A1* | 5/2010 | Verhagen ................ B60T 7/042 |
| | | 701/70 |
| 2012/0118683 A1 | 5/2012 | Desbois-Renaudin et al. |
| 2013/0047593 A1* | 2/2013 | Weiberle .................. B60T 1/10 |
| | | 60/327 |
| 2013/0181506 A1* | 7/2013 | Weiberle ................ B60T 7/042 |
| | | 303/3 |
| 2013/0231839 A1 | 9/2013 | Baehrle-Miller et al. |
| 2014/0257658 A1 | 9/2014 | Shimizu |
| 2014/0345986 A1* | 11/2014 | Foitzik ...................... B60T 7/12 |
| | | 188/106 P |
| 2015/0028664 A1* | 1/2015 | Choi ..................... B60T 8/4077 |
| | | 303/3 |
| 2015/0307072 A1* | 10/2015 | Strengert ............. B60T 8/3265 |
| | | 303/81 |
| 2015/0360666 A1* | 12/2015 | Gerdes ...................... B60T 7/06 |
| | | 60/545 |

FOREIGN PATENT DOCUMENTS

| | | |
|---|---|---|
| CN | 102398585 A | 4/2012 |
| CN | 102431539 A | 5/2012 |
| CN | 202728214 U | 2/2013 |
| CN | 103079921 A | 5/2013 |
| CN | 103124660 A | 5/2013 |
| CN | 103619679 A | 3/2014 |
| CN | 104029666 A | 9/2014 |
| DE | 10 2004 004 992 A1 | 9/2005 |

* cited by examiner

METHOD FOR VERIFYING THE PARKING BRAKE FORCE IN A VEHICLE This application is a 35 U.S.C. § 371 National Stage Application of PCT/EP2016/064856, filed on Jun. 27, 2016, which claims the benefit of priority to Serial No. DE 10 2015 214 809.2, filed on Aug. 4, 2015 in Germany, the disclosures of which are incorporated herein by reference in their entirety.

The disclosure concerns a method for verifying the parking brake force in a vehicle with a hydraulic vehicle brake and an electromechanical brake mechanism.

BACKGROUND

In DE 10 2004 004 992 A1, a parking brake system is described that comprises an electric brake motor for producing a parking brake force that holds the vehicle at a standstill. The parking brake system with the electric brake motor is integrated within the hydraulic wheel brake, wherein the brake motor displaces a brake piston towards a brake disk to produce the parking brake force. During a regular braking process, the brake piston is actuated by the hydraulic vehicle brake.

During parking of the vehicle, the desired parking brake force is produced by means of the parking brake system with the electric brake motor. If it is determined that the parking brake force is not reaching a required level of braking force, the hydraulic vehicle brake is additionally actuated, by means of which an additional braking force is produced.

SUMMARY

With the method according to the disclosure, a parking brake force in a vehicle can be verified that is provided both by means of an electromechanical brake mechanism with an electric brake motor and also by means of a hydraulic vehicle brake. The hydraulic vehicle brake is the usual brake that is used to decelerate the vehicle while driving. During parking of the vehicle, the required parking brake force is primarily produced by means of the electromechanical brake mechanism, wherein the hydraulic vehicle brake is additionally actuated if the required level of parking braking force cannot be achieved by actuating the electromechanical brake mechanism alone.

The electric brake motor and the hydraulic vehicle brake act in particular on the same brake piston, which is a carrier of a brake lining that is pressed against a brake disk. The hydraulic vehicle brake is equipped with a brake booster in order to convert the brake pedal force that is produced by the driver into an increased brake pressure of the brake fluid.

The method according to the disclosure concerns situations in which both the electromechanical brake mechanism with the electric brake motor and also the hydraulic vehicle brake with the brake booster are active in order to produce a desired parking brake force. If both types of brake are actuated at the same time, then it is advantageous for safety reasons that the contributions to the total parking brake force of the hydraulic force and the electromechanical force are differentiated in order to be able to verify and guarantee the effectiveness of each type of brake and the braking force provided by each type of brake. Using the method according to the disclosure for verifying the parking brake force, the effectiveness of the hydraulic vehicle brake can be monitored. This is carried out using a comparison of the displacement of the brake booster of the hydraulic vehicle brake with a reference travel, wherein an error signal is produced in the case of an impermissibly large deviation. The error signal can be processed further in a suitable manner, for example can be displayed to the driver and/or can be used to provide an additional braking force or can be used in a driver assistance system.

According to an advantageous embodiment, the brake booster comprises an electric motor for boosting that is actuated to produce a hydraulic braking force (iBooster). The brake booster is usually not a hydraulic pump of an electrical stability program (ESP), which may additionally be integrated within the hydraulic vehicle brake. The brake booster preferably sits directly on the brake master cylinder of the hydraulic vehicle brake and can be actuated by means of a control unit. According to an alternative embodiment, the brake booster is the hydraulic pump of the electronic stability program or the anti-lock brake system.

According to an advantageous embodiment, the travel of the brake booster that is actually traversed is determined by sensor. Said travel is compared with the reference travel that is advantageously determined from a pressure difference between a hydraulic target parking brake pressure and a lower brake pressure, at which one or more brake circuits of the hydraulic vehicle brake are hydraulically isolated, for example by closing the inlet valves in the hydraulic vehicle brake. The increase of the hydraulic pressure after closing the valves causes an elastic deformation of the brake caliper or brake calipers, wherein the elastic deformation corresponds to a volume from which the reference travel can be concluded with knowledge of the stiffness of the caliper and the geometry of the piston of the brake booster and the brake piston.

The pressure difference in the case of the increase of the hydraulic brake pressure corresponds to a relative displacement of the brake booster that can be measured. The stiffness of the brake caliper of the vehicle brake can be calculated from the relative displacement of the brake booster, taking into account the pressure difference and the geometry of the brake booster. In a further step, an equivalent pressure is determined that corresponds to an electromechanical target parking brake force that is to be applied by the electromechanical brake mechanism or the electric brake motor. From the equivalent pressure and the stiffness of the brake caliper, an equivalent volume is determined, from which the reference travel is calculated taking into account the piston area of the brake booster. Said reference travel is then compared with the measured travel of the brake booster, wherein an error signal is produced in the case of an excessively large deviation.

The brake booster amplifies the pedal movement produced by the driver in a brake master cylinder. Accordingly, instead of the geometry of the brake booster, the geometry of the brake master cylinder is taken into account.

If an impermissibly large deviation is detected between the actual travel of the brake booster and the reference travel, an additional braking process may be carried out, during which the additional braking force is produced either by actuating the electric brake motor of the electromechanical brake mechanism and/or by actuating the brake booster of the hydraulic vehicle brake.

In the case of an impermissibly large deviation between the actual travel of the brake booster and the reference travel, the direction of the deviation can provide an indication of the underlying fault. If the actual travel traversed is less than the reference travel, this indicates a reduced throughflow of brake fluid through a hydraulic line. Accordingly, an error signal can be produced that indicates a hydraulic fault. However, it is also possible in this case that the provided parking brake force of the electromechanical brake mechanism is too small, wherein the error signal produced can indicate the insufficient parking brake force. Distinguishing between a hydraulic fault and an electromechanical fault may be carried out by means of further brake variables.

If the actual travel traversed of the brake booster is greater than the reference travel, this can indicate an increased leak in the hydraulic vehicle brake. Accordingly, a leak in the hydraulic vehicle brake can be indicated by the error signal. The greater travel of the brake booster compared to the reference travel can however also indicate an excessive parking brake force of the electromechanical brake mechanism, and the error signal produced can contain corresponding information. Also in this case, distinguishing between hydraulic faults and electromechanical faults may be carried out by means of further brake variables.

The individual steps of the method are conducted in a regulating unit or control unit, in which actuating signals are produced for actuating the different components of the brake system with the hydraulic vehicle brake including the brake booster and the electromechanical brake mechanism with the electric brake motor. The brake system comprises both the hydraulic vehicle brake and also the electromechanical brake mechanism.

BRIEF DESCRIPTION OF THE DRAWINGS

Further advantages and advantageous embodiments are to be found in the further claims, the description of the figures and the drawings. In the figures:

DETAILED DESCRIPTION

Figure 1:
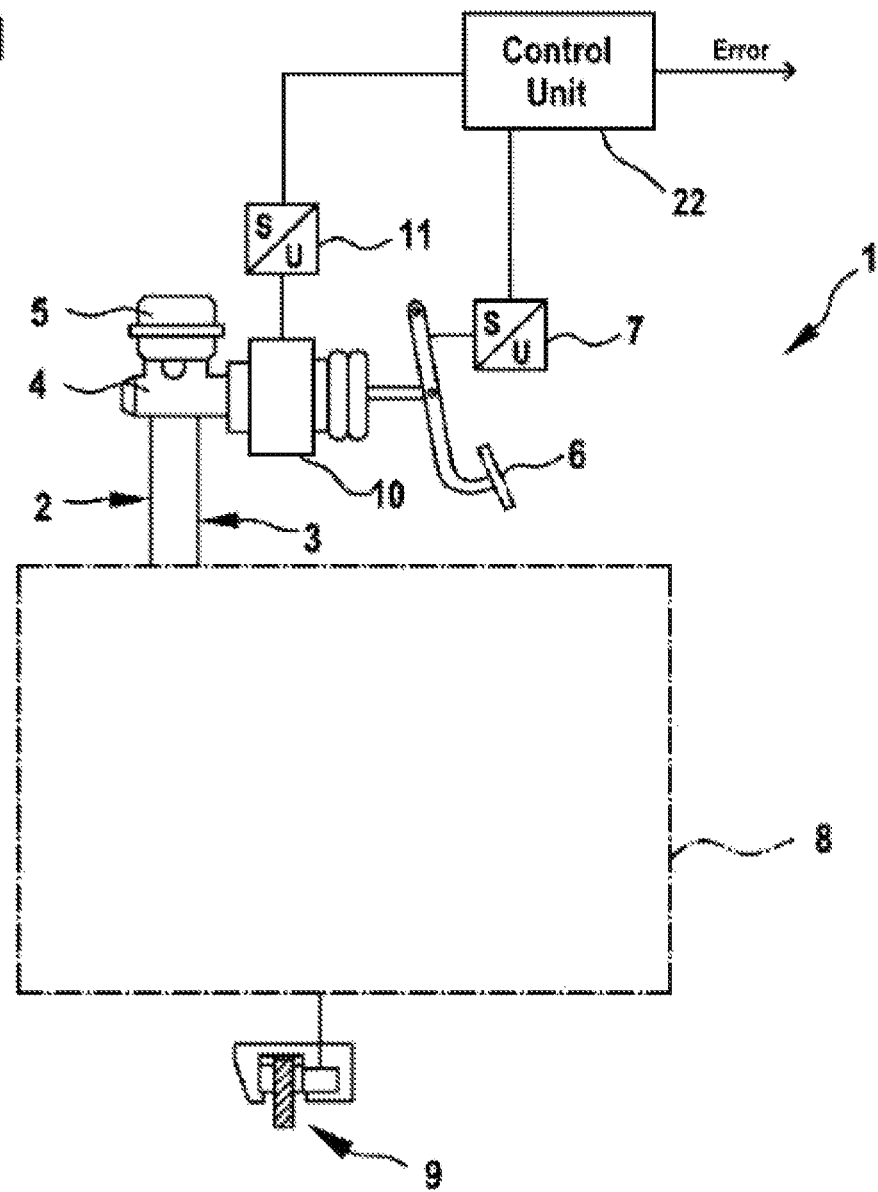
FIG. 1 shows a schematic representation of a brake system in a vehicle, with a hydraulic vehicle brake comprising a brake booster, wherein an electric brake motor is additionally disposed on the wheel brake device.

The same components are provided with the same reference characters.

The brake system 1 for a vehicle that is represented in FIG. 1 comprises a hydraulic vehicle brake with a front axle brake circuit 2 and a rear axle brake circuit 3 for supplying and actuating wheel brake devices 9 on each wheel of the vehicle with a brake fluid under hydraulic pressure. The two brake circuits 2, 3 are connected to a common brake master cylinder 4, which is supplied with brake fluid by means of a brake fluid reservoir container 5. The brake master cylinder 4 is actuated by the driver by means of the brake pedal 6, and the pedal travel exerted by the driver is measured by means of a pedal travel sensor 7. Between the brake pedal 6 and the brake master cylinder 4 there is a brake booster 10, which comprises for example an electric motor that is preferably actuated by means of a gearbox of the brake master cylinder 4 (iBooster). The brake pedal 6 displacement measured by the pedal travel sensor 7 is transmitted as a sensor signal to a regulating unit or a control unit 22, in which actuating signals for actuating the brake booster 10 are produced. The boosting movement of the brake booster 10 is transferred by means of an actuating rod of the brake booster 10, wherein the travel of the actuating rod is determined by means of a sensor 11 that is integrated within the brake booster 10.

The travel of the brake master cylinder 4 may be determined by means of the sensor 11.

Supplying the wheel brake devices 9 with brake fluid is carried out in each brake circuit 2, 3 by means of different switching valves, which, including further units, are part of the brake hydraulics 8. The brake hydraulics 8 also include a hydraulic pump that is a component of an electronic stability program (ESP).

Figure 2:
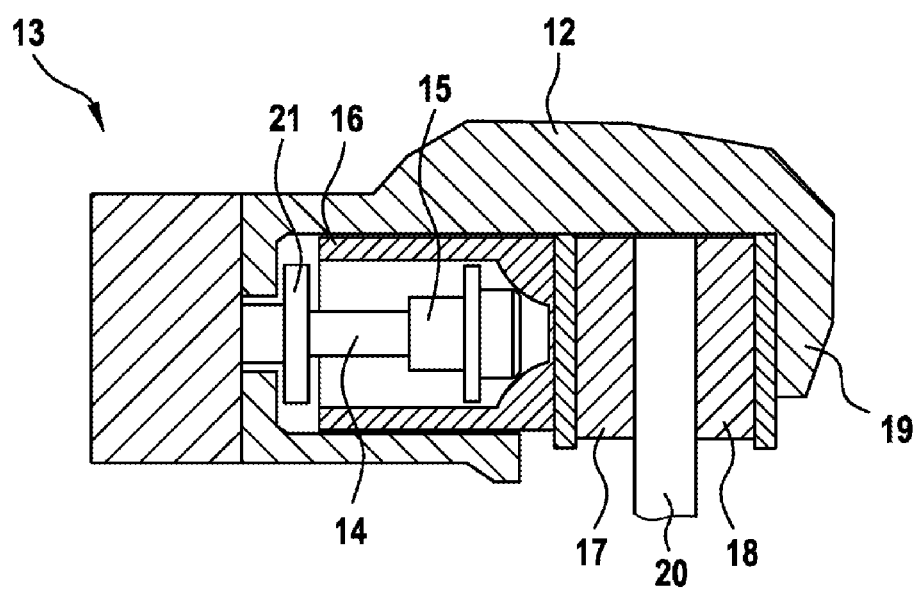
FIG. 2 shows a section through an electromechanical brake mechanism with an electric brake motor.

In FIG. 2, an electromechanical brake mechanism is represented, which is preferably used for detecting a vehicle at a standstill but can also be used during movement of the vehicle, in particular at lower vehicle speeds below a speed limit value. The electromechanical brake mechanism comprises a brake caliper 12 with a claw 19 that overlaps a brake disk 20. As an actuator, the brake mechanism comprises a d.c. electric motor as a brake motor 13, the rotor shaft of which drives a spindle 14 rotationally, on which a spindle nut 15 is rotatably supported. During a rotation of the spindle 14, the spindle nut 15 is displaced axially. The spindle nut 15 moves within a brake piston 16 that carries a brake lining 17 that is pressed against the brake disk 20 by the brake piston 16. On the opposite side of the brake disk 20 there is a further brake lining 18 that is positionally fixedly mounted on the claw 19.

Within the brake piston 16, the spindle nut 15 can move axially forwards towards the brake disk 20 during a rotary motion of the spindle 14 or axially rearwards during an opposite rotary motion of the spindle 14 until reaching a stop 21. To produce a clamping force, the spindle nut 15 acts on the inner end face of the brake piston 16, whereby the brake piston 16 that is axially movably mounted in the brake mechanism is pressed with the brake lining 17 against the facing end face of the brake disk 20.

The electromechanical brake mechanism is integrated within the wheel brake device 9 (FIG. 1) of the hydraulic vehicle brake by the hydraulic pressure of the hydraulic vehicle brake, with which the vehicle is decelerated while travelling, acting on the brake piston 16. The hydraulic pressure can also provide assistance when the vehicle is at a standstill when actuating the electromechanical brake, so that the total braking force consists of the electromotive component and the hydraulic component. Likewise, both the hydraulic vehicle brake and also the electromechanical brake mechanism can be actuated while the vehicle is travelling, and each can produce a braking force.

Figure 3:
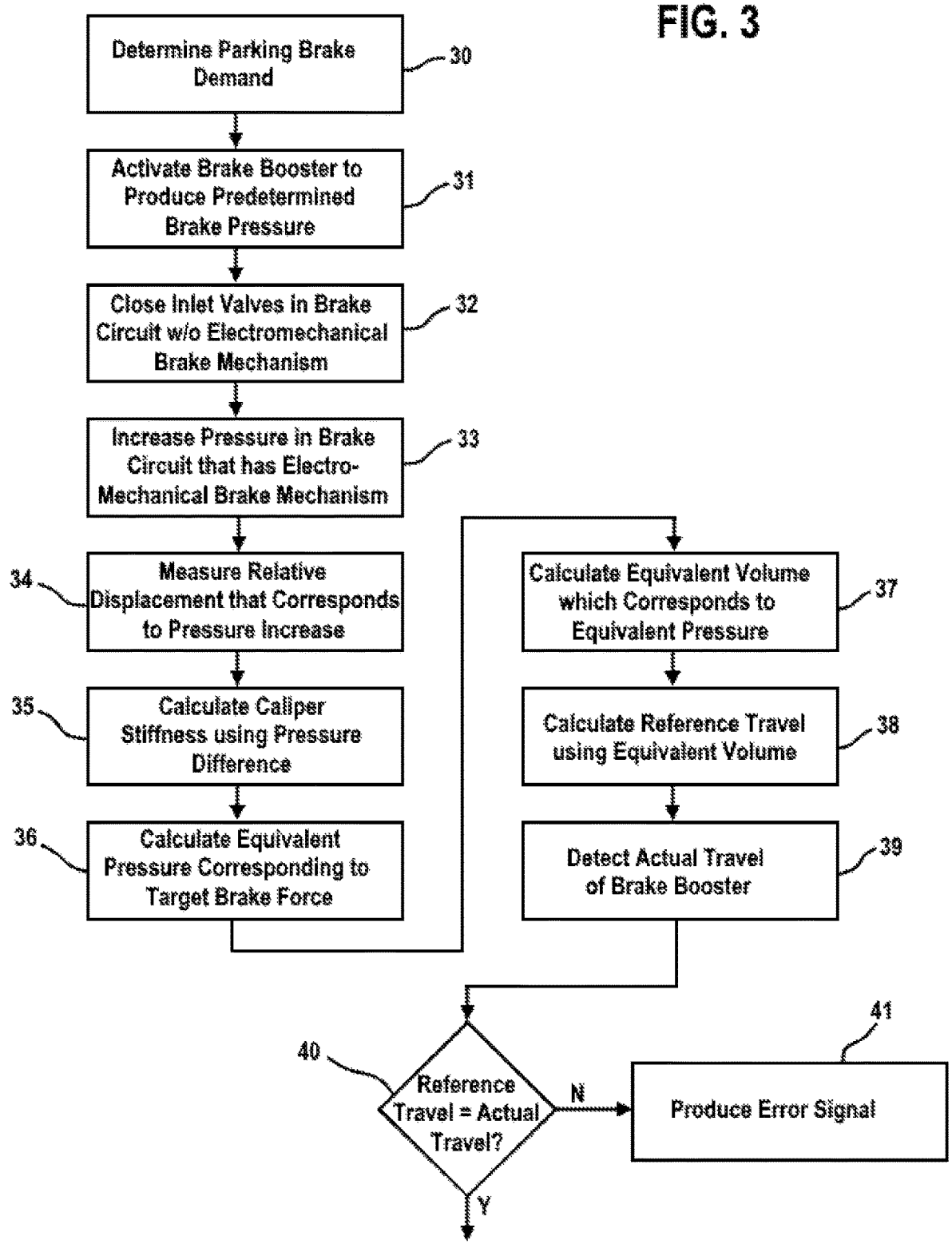
FIG. 3 shows a flow chart for producing a braking force that holds the vehicle at a standstill and for verifying the braking force.

In order to ensure that the hydraulic component of the parking brake force is sufficiently large during a parking process, in which both the hydraulic vehicle brake and also the electromechanical brake mechanism are actuated, the method represented in FIG. 3 for verifying the parking brake force is carried out. Initially, in a first step of the method 30 the parking brake demand is determined, and the parking brake process is initiated by activating both the hydraulic vehicle brake and also the electromechanical brake mechanism. The parking brake demand, which is triggered either manually by the driver or automatically by means of a driver assistance function, can be detected in an electronic stability program (ESP) in the vehicle. The electronic stability program passes the parking brake demand to the brake booster 10 (iBooster) of the hydraulic vehicle brake and the electromechanical brake mechanism with the electric brake motor.

In the next step 31, a predetermined hydraulic brake pressure is produced by means of the brake booster 10, which may be gradient-dependent in order to ensure that the vehicle does not roll away inadvertently when parked on a slope. If for example there is a pressure demand of 40 bar in the brake booster 10, initially a lower pressure of for example 30 bar is produced. Then in the next step of the method 32, the brake circuit in the hydraulic vehicle brake in which the electromechanical brake mechanism with the brake motor is not effective is isolated by closing the inlet valves; this only occurs on the wheel brake devices of one brake circuit, for example on the rear axle of the vehicle, whereas the second brake circuit is not equipped with an electromechanical brake mechanism.

After closing the inlet valves in the brake circuit without an electromechanical brake mechanism, in the next step 33 the pressure in the second brake circuit, on which the electromechanical brake mechanism is disposed, is increased further up to the target pressure of for example 40 bar. In the step 34, the associated relative displacement of the brake booster, which corresponds to the pressure increase from 30 bar to 40 bar, is measured by sensor. The relative displacement refers to the distance of movement of the brake booster, e.g., the actuating rod or the piston of the master cylinder, which results in the pressure difference. The relative displacement may be determined by measuring the travel of the actuating rod using the sensor 11. Thereupon, in the step 35 the stiffness $c_{cal}$ of the brake caliper of the vehicle brake can be calculated taking into account the pressure difference between the lower brake pressure plow of bar and the higher hydraulic target parking brake pressure $p_{soil}$ of 40 bar according to $$c_{cal} = \frac{\Delta p}{\Delta V} = \frac{\Delta p}{\Delta s \cdot A_{Hz}} = \frac{4 \cdot \Delta p}{\Delta s \cdot \pi \cdot d_{Hz}^2}$$

taking into account the geometry of the actuating piston of the brake booster with the piston area $A_{Hz}$ and the piston diameter $d_{Hz}$.

In the next step 36, the equivalent pressure $p_{em}$, which corresponds to an electromechanical target parking brake force $F_{em}$, is calculated according to $$p_{em} = \frac{F_{em}}{A_{pist}}$$

taking into account the piston area $A_{pist}$ of the brake piston. The electromechanical target parking brake force $F_{em}$ is for example specified at 10 kN.

In the subsequent step 37, the equivalent volume $\Delta V_{em}$, which corresponds to the equivalent pressure $p_{em}$, is determined from the ratio of the equivalent pressure $p_{em}$, and the stiffness of the caliper ccal:

$$\Delta V_{em} = \frac{p_{em}}{c_{cal}}$$

From the equivalent volume $\Delta V_{em}$, the reference travel $s_{ges}$ can be calculated according to $$s_{ges} = \frac{\Delta V_{em}}{A_{Hz}}$$

taking into account the piston area $A_{Hz}$ of the brake booster (step 38). The term "reference travel" refers to the travel, or distance of movement, of the brake booster, in particular, the actuating rod of the brake booster, which is determined indirectly from other parameters of the brake system as described above in contrast to the actual travel of the brake booster which is measured using a sensor.

In the next step 39, the actual travel $s_{real}$ of the brake booster is determined by sensor. The travel of the actuating rod as determined by the sensor 11 may be used as the actual travel of the brake booster. In the step 40, a comparison between the actual travel $s_{real}$ of the brake booster and the reference travel $s_{ges}$ is carried out. If the two values agree to within a permissible tolerance range, the yes branch ("Y") is followed, there is no fault, so that it can be assumed therefrom that the hydraulic parking brake component is correct. If on the other hand the actual travel $s_{real}$ of the brake booster and the reference travel $s_{ges}$ do not agree, the no branch ("N") is then advanced to the next step 41, in which an error signal is produced. The error signal may be generated by the control unit in any suitable manner. The error signal can be displayed to the driver and/or further processed in the vehicle, for example leading to a further clamping process in the electromechanical brake mechanism and/or to a pressure increase of the hydraulic brake pressure.

In this case, it can be distinguished as to whether the actual travel $s_{real}$ is less than or greater than the reference travel $s_{ges}$. If the travel $s_{real}$ is less than the reference travel $s_{es}$, then it can be assumed therefrom that sufficient brake fluid is not passing to the wheel brake device, for example owing to a defective hydraulic line with restricted through-flow. In addition or alternatively, it is also possible that the parking brake force provided by the electromechanical brake mechanism is too small. In both cases, the driver can be advised of the parking brake force being too low.

If the actual travel $s_{real}$ is greater than the calculated reference travel $s_{ges}$, this indicates an increased leak in the hydraulic vehicle brake in the pressure range under consideration. Accordingly, leaks in the vehicle brakes can be detected earlier than with conventional systems. In the case of a greater actual travel in comparison to the reference travel, the parking brake force provided by the electromechanical brake mechanism may also be too great. An error signal can also be displayed to the driver in this case.

The invention claimed is:

1. A method for verifying a parking brake force in a vehicle, the vehicle including a hydraulic vehicle brake with a brake booster and an electromechanical brake mechanism with an electric brake motor for producing a braking force to displace a brake piston, the method comprising:
    measuring an actual travel of the brake booster by detecting displacement of an actuating rod of the brake booster using a sensor in the brake booster, the actuating rod being configured to output a boosting movement of the brake booster;
    comparing the actual travel of the brake booster with a reference travel of the brake booster;
    determining the reference travel using a pressure difference between a hydraulic target parking brake pressure and a lower parking brake pressure, at which one or more brake circuits of the hydraulic vehicle brake are hydraulically isolated; and
    producing an error signal in case of a predetermined deviation between the actual travel of the brake booster and the reference travel.

2. The method as claimed in claim 1, further comprising:
determining a relative displacement of the brake booster, which corresponds to the pressure difference of the lower parking brake pressure from the higher hydraulic target parking brake pressure; and
calculating the reference travel using the relative displacement of the brake booster.

3. The method as claimed in claim 2, further comprising:
calculating a stiffness of a brake caliper of the vehicle brake from the relative displacement of the brake booster and the pressure difference;
determining from the stiffness of the brake caliper and an equivalent pressure, which corresponds to an electromechanical target parking brake force, an equivalent volume; and
calculating the reference travel using:

$$c_{cal} = \frac{\Delta p}{\Delta V} = \frac{\Delta p}{\Delta s \cdot A_{Hz}} = \frac{4 \cdot \Delta p}{\Delta s \cdot \pi \cdot d_{Hz}^2}$$

$$\Delta V_{em} = \frac{p_{em}}{c_{cal}}, \quad p_{em} = \frac{F_{em}}{A_{pist}}$$

$$s_{ges} = \frac{\Delta V_{em}}{A_{Hz}}$$

wherein
$\Delta p$ denotes the pressure difference between the lower brake pressure and the higher hydraulic target parking brake pressure,
$\Delta s$ denotes the relative displacement of the brake booster for the pressure difference $\Delta p$,
$\Delta V_{em}$ denotes an equivalent volume,
$A_{Hz}$ denotes a piston area of the brake booster or the brake master cylinder,
$c_{cal}$ denotes the stiffness of the brake caliper of the vehicle brake,
$F_{em}$ denotes the electromechanical target parking brake force,
$p_{em}$ denotes the equivalent pressure of the electromechanical target clamping force,
$A_{pist}$ denotes a brake piston area of the brake piston, and
$s_{ges}$ denotes the reference travel.

4. The method as claimed in claim 1, further comprising:
determining the reference travel taking into account an electromechanical target parking braking force.

5. The method as claimed in claim 1, further comprising:
actuating an electric booster motor included in the brake booster to produce a hydraulic braking force, wherein the electric booster motor is configured for boosting.

6. The method as claimed in claim 1, further comprising:
indicating the error signal at least one of visually and audibly.

7. The method as claimed in claim 1, further comprising:
producing an additional braking force by actuating the electric brake motor during a further clamping process due to the error signal.

8. The method as claimed in claim 1, further comprising:
producing an additional braking force by actuating the brake booster of the hydraulic vehicle brake during a further clamping process due to the error signal.

9. The method as claimed in claim 1, wherein the comparison of the actual travel of the brake booster with the reference travel of the brake booster begins once a build-up of a clamping force starts on actuating the electromechanical brake mechanism.

10. The method as claimed in claim 1, wherein the steps of comparing the actual travel of the brake booster with the reference travel of the brake booster and producing the error signal in case of a predetermined deviation between the travel of the brake booster and the reference travel are carried out by a regulating unit or a control unit.

* * * * *